United States Patent [19]
Willibald

[11] Patent Number: 5,366,169
[45] Date of Patent: Nov. 22, 1994

[54] APPARATUS FOR COMMINUTING AND COMPOSTING OF ORGANIC WASTE MATERIALS PILED UP IN LOOSE HEAPS

[75] Inventor: Josef Willibald, Altheim, Germany

[73] Assignee: J. Willibald GmbH Maschinenfabrik, Wald-Sentenhart, Germany

[21] Appl. No.: 202,863

[22] Filed: Feb. 25, 1994

Related U.S. Application Data

[63] Continuation-in-part of Ser. No. 991,793, Dec. 17, 1992, abandoned.

[30] Foreign Application Priority Data

Dec. 20, 1991 [DE] Germany .............................. 4142135

[51] Int. Cl.⁵ ......................... B02C 21/02; C05F 9/00; C09K 17/00
[52] U.S. Cl. ................................... 241/101.7; 241/605
[58] Field of Search ...................... 241/101.7, 28, 605; 56/13.9, 330

[56] References Cited

U.S. PATENT DOCUMENTS

| | | | |
|---|---|---|---|
| 2,661,584 | 12/1953 | Ronning | 241/101.7 X |
| 3,881,707 | 5/1975 | Toto | 241/101.7 |
| 4,355,670 | 10/1982 | Ohrberg et al. | 241/101.7 X |
| 4,386,492 | 6/1983 | Tilby | 56/13.9 |
| 4,690,224 | 9/1987 | Shwez | 241/101.7 X |

FOREIGN PATENT DOCUMENTS 3927864  3/1990  Germany ........................... 241/101.7

Primary Examiner—Douglas D. Watts
Attorney, Agent, or Firm—Anderson Kill Olick & Oshinsky

[57] ABSTRACT

There is provided a self-propelled mechanized apparatus for comminuting organic waste material, such as graveyard trash, shrubbery, branches, and municipal and private rottable waste. The apparatus includes a precompression device for precompressing the waste material, which is usually piled up in loose heaps, a comminuting device, and a discharge band, which circulates sideward of the traffic lane of the apparatus for piling up a comminuted waste in stacks.

6 Claims, 2 Drawing Sheets

APPARATUS FOR COMMINUTING AND COMPOSTING OF ORGANIC WASTE MATERIALS PILED UP IN LOOSE HEAPS

This is a continuation-in-part of application Ser. No. 07/991,793 filed Dec. 17, 1992, now abandoned.

BACKGROUND OF THE INVENTION

The invention relates to an apparatus for comminuting of organic waste materials, which are piled up in loose heaps, such as, e.g., graveyard trash, shrubbery or branches, as well as municipal or private rottable waste material, for composting or producing cover material for landscaping surfaces and the like. Accordingly, the invention relates to a combination apparatus for effecting all necessary operations for composting organic waste materials, such as comminuting of bushes or shrubbery, brushwood, graveyard trash, among others, as well as piling up of the comminuted materials in stacks, moving the stacks away, and recomminuting of the material along with sifting of a ready compost can be effected one after another with the same apparatus.

In all known comminuting processes, which have been used up to the present time, comminuting of the rottable organic starting material, following piling-up of the comminuted material in a stack, moving the stack away during the rotting process along with eventual sifting of the already made compost, are always conducted at separate working spots with a plurality of separate special apparatuses. This requires in most cases using of bucket wheel loaders or the like transporting devices for transporting the starting and also rotting material from one apparatus and location to a next apparatus and location.

High costs, associated with acquisition and maintenance of such, apparatuses, and a requirement in a large working area, as well as in a large stocking area for a respective garbage site, together with likewise large expenditure of time and need in personnel, are main drawbacks of the composting processes, which have been used up to the present time.

SUMMARY OF THE INVENTION

The main object of the invention is providing a single installation or a corresponding mechanized apparatus for effecting as many of the essential processes, which are necessary for comminuting of a rottable organic waste material, as possible. Another object of the invention is providing a single installation or a corresponding mechanized apparatus which is self-propelling and, therefore, can be driven to a stock of material and, thus, makes special means for transporting the stock at a garbage site unnecessary, and which, at the same time, performs all operational steps, while moving along the stock or the stack. A further object of the invention is a mechanized apparatus that comprises all devices, which are necessary for effecting a particular operational process.

These and other objects of the invention, which will become more apparent thereafter, are achieved by providing a mechanized, motor-driven comminuting apparatus including precompression, pick-up, transporting, and comminuting devices for processing a fresh or rotted waste material, as well as a sideward circulating discharging band or the like for piling the comminuted stock in a stack. The comminuting apparatus according to the invention also preferably includes a sifting device and, if necessary, a sacking device, which can be formed as auxiliary devices that are mounted on or connected to the apparatus only, if needed.

These and other objects and features of the present invention will become more apparent, and the invention itself will be best understood from the following detailed description of the preferred embodiment when read with reference to the accompanying drawings.

DETAILED DESCRIPTION OF THE PREFERRED EMBODIMENT

Figure 1:
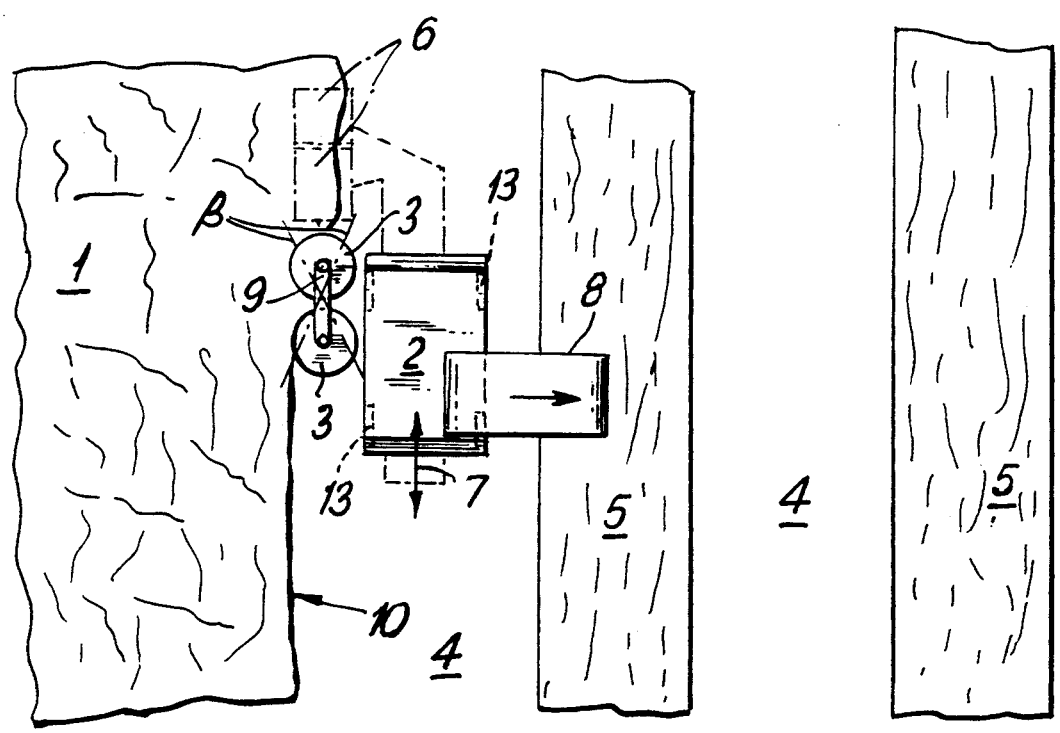
FIG. 1 shows a schematic top view of a combination apparatus according to the invention for treating a rottable starting material at a garbage site.
Figure 2:
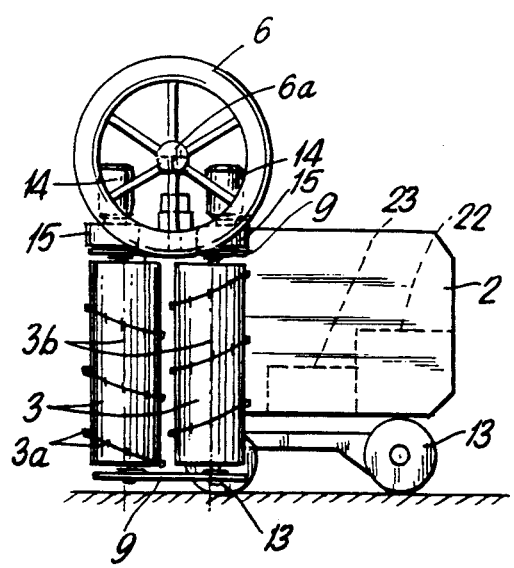
FIG. 2 shows a schematic elevational view of essential processing elements.
Figure 3:
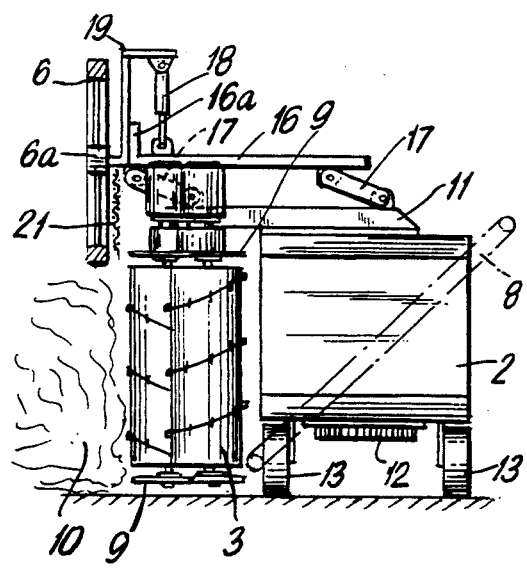
FIG. 3 shows a side view of the elements shown in FIG. 2

Loose heaps of an organic waste material 1, which is piled up in a rot hanger or at an uncovered garbage site, is processed by a single mechanized apparatus 2, as shown in FIGS. 1 through 3, for producing compost or a cover material for landscaping.

The apparatus is motor-driven and is self-propellable to the waste material. A plurality of devices 3, which are displaceable with high speed, are mounted on the apparatus 2 for comminuting the waste material during repeated runs along the stock. The comminuted material is piled up, sideways of a traffic lane 4, up to a desired height to form stacks 5 arranged at a predetermined distance from each other. The stack may have, e.g., a trapezoidal shape.

After expiration of predetermined rotting time, the at least once piled-up stacks 5 are moved away, and the same apparatus 2 with its comminuting devices 3, which operate at a reduced speed during forming of the stacks, again effects piling up of the material sideways of the traffic lane 4 and forms simultaneously new stacks 5, preferably at a spot where the removed previous stack stood.

The apparatus comprises a precompression device 6 for precompressing the starting material 1, which lies on the bottom as loose heaps, before pick-up and delivery of the material 1 to the high speed comminuting devices 3, which may be formed as milling devices. The material is comminuted during displacement of the apparatus 2 in forward and backward directions 7 along and progressively parallel to the same traffic lane 4.

The precompression device 6 insures uniform cutting of the starting material 1 by the milling rollers of the comminuting devices 3, and prevents delivery to the comminuting devices of unregulated heaps which can block the comminuting devices 3. By alternative forward and backward travel of the apparatus 2, it is achieved that processing can be economically conducted on a smallest area, because no unused area is necessary for turning of the apparatus 2. During up to now described operational steps, which are already adequate for producing a cover material, it can be advantageous, for producing a fine compost if, at the moving of the stack away and at the same time, sifting along with sacking of the already available fine compost is effected, together with simultaneous intensive recomminuting of not yet rotted residual material and a renewed piling-up of the same again in a parallel stack.

The up to now described motor-driven apparatus is further characterized in that the mounted thereon pick-up, transporting, and comminuting devices are inclined to the traffic lane at an angle that is adjustable. The discharge band 8, which circulates sideward of the traffic lane and serves for piling of the comminuted stock, as well as not shown sifting and sacking devices can be formed as auxiliary devices which are mounted or connected only, if needed.

All devices are preferably provided with a hydraulic drive. It is important that the comminuting devices work in opposite direction, are driven about far-reaching vertical axes, and are provided each with a pair of milling rollers having cutter-tip working elements. The comminuting devices 3 are pivotably arranged on a common cross-bar 9 and are adjustable over angle $\beta$ to a stock or stack side 10. This insures that the comminuting devices in each case are arranged at a most favorable setting angle to the stock or stack side.

The precompression device 6 can be arranged, in the travel direction 7, in front of or at the same level about the comminuting devices 3. The precompression device 6 may comprise driven or self-rotatable pressure rollers. Instead of pivoting of the comminuting devices 3 by means of a support arm 11 and upper and lower cross-bar 9, it is possible to pivotably mount the whole apparatus 2, e.g., by means of a ring gear 12, on a wheel or crawler running gear 13, or, at composting in a hanger, to pivotably secure the apparatus 2, in a suspended form, on a crane bridge.

As shown in FIGS. 2 and 3, the comminuting devices or milling rollers 3 are provided on their circumference with a plurality of tines 3a arranged along a helical line. Each of the milling rollers 3 is supported on an axle 3b. Each milling roller 3 is driven by a motor 14 and a transmission 15 having appropriate wheels, which are supported on the output shaft of the motor 14 and the upper end of the axle 3b. The motors 14 can be hydraulic or electric motors. Electric motors are preferably used when the entire apparatus is suspended from a crane bridge for so-called shop composting. The respective motors 14 drive the respective milling rollers 3 in opposite direction. Opposite rotation of the rollers 3 insures that all torques, caused by acting forces cancel each other, so that they do not exert an adverse influence on the apparatus maneuverability.

Figure 4:
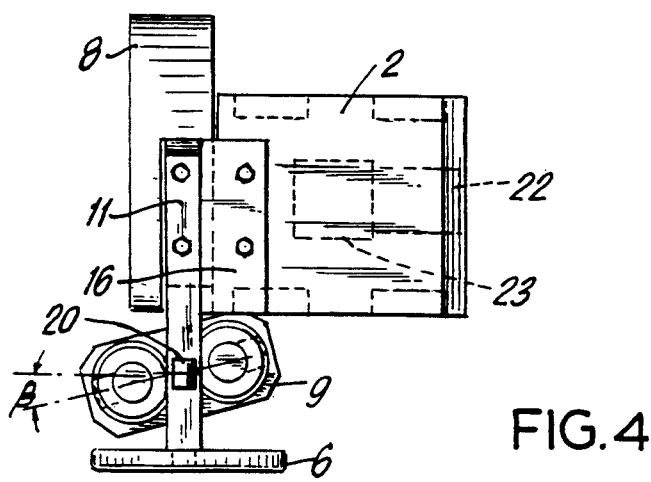
FIG. 4 shows a plan view of the elements shown in FIG. 2.

The precompression device or pressure rollers 6 which are freely rotatable about their bearing axes 6a and are adjustably supported by a height-adjustable trolley 19. For adjusting the height of the trolley, there is provided a hydraulic cylinder 18. The cylinder 18 is connected to the elevating table 16, which is provided with an end shoulder 16a abutting the trolley 19. The elevating table 16 itself can be made height-adjustable relative to the support arm 11 by means of a parallelogram arrangement, which may be actuated with a hydraulic cylinder (not shown). For pivoting the cross-bar 9 by the angle $\beta$, a hydraulic cylinder 20 is used, as shown in FIG. 4. For preventing the branches or the like, which are drawn out by comminuting rollers 3 from the precompressed stock 10, from penetrating into spokes of the wheel of the precompression device 6, a screen metal sheet 21 is provided between the comminuting rollers 3 and the wheel of the precompression device.

The apparatus is self-propelled by an engine 22 and a transmission 23 (shown in blocks) in a known manner.

While the present invention has been shown and described with reference to a preferred embodiment, various modification thereof will be apparent to those skilled in the art and, therefore, it is not intended that the invention be limited to the disclosed embodiment and/or to the details thereof, and departures can be made therefrom within the spirit and scope of the invention as defined in the appended claims.

What is claimed is:

1. A self-propelled apparatus for comminuting organic waste material, which is piled up in loose heaps and comprises at least one of graveyard trash, shrubbery, branches, municipal rottable waste, and private rottable waste, said apparatus comprising:
   precompression means and means for adjustably supporting said precompression means on the body of said apparatus;
   means for comminuting the precompressed waste material;
   means for adjustably supporting said comminuting means on the body of said apparatus; and
   orbiting transport means, which is adjustably supported by support means on the body of said apparatus, and is displaceable therewith, and projects sideward of a traffic lane of said apparatus, for piling up the comminuted waste material in a stack;
   wherein said comminuting means comprises a pair of milling rollers operable in opposite directions and driven about spaced vertical axes, and a common cross-bar means for supporting said milling rollers, said milling rollers being provided with cutter tip working surfaces and said crossbar means being adjustable over a predetermined angle relative to a verticle axis to move said rollers to a side of one to a heap of the waste material and a stack of the waste material.

2. An apparatus as set forth in claim 1, wherein the common cross-bar means includes plate-like upper and lower frames in which axes of respective milling rollers are respectively arranged.

3. An apparatus as set forth in claim 1, wherein said precompression means comprises one of driven pressure rollers or self-rotatable pressure rollers arranged, in a travel direction of said apparatus, in front of or at the same level as said comminuting means and above said comminuting means.

4. An apparatus as set forth in claim 1, wherein at least one of said precompression means, said comminuting means, and said transport means has a hydraulic drive.

5. An apparatus as set forth in claim 1, wherein said milling rollers are driven with a high speed during a comminuting operation, and at a low speed during forming of the stack.

6. An apparatus asset forth in claim 1, further comprising running gear for supporting said apparatus, and ring gear means for pivotably mounting the body of said apparatus on said running gear.

* * * * *